United States Patent
Nakajima et al.

(10) Patent No.: US 7,630,161 B2
(45) Date of Patent: Dec. 8, 2009

(54) METHOD AND APPARATUS FOR WRITING SPIRAL SERVO PATTERN IN A DISK DRIVE

(75) Inventors: Shouji Nakajima, Kodaira (JP); Masahide Yatsu, Akishima (JP); Hideo Sado, Ome (JP); Katsuki Ueda, Tachikawa (JP); Toshitaka Matsunaga, Ome (JP); Seiji Mizukoshi, Nishitama-gun (JP); Shinichirou Kouhara, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/960,933

(22) Filed: Dec. 20, 2007

(65) Prior Publication Data

US 2008/0151412 A1 Jun. 26, 2008

(30) Foreign Application Priority Data

Dec. 26, 2006 (JP) .............................. 2006-350013

(51) Int. Cl.
*G11B 21/02* (2006.01)
*G11B 5/09* (2006.01)
*G11B 5/596* (2006.01)

(52) U.S. Cl. .......................... 360/75; 360/51; 360/78.04

(58) Field of Classification Search ........................ None
See application file for complete search history.

(56) References Cited

U.S. PATENT DOCUMENTS

| 5,748,398 | A | 5/1998 | Seo |
| 6,785,075 | B2 | 8/2004 | Bryant et al. |
| 6,965,489 | B1 | 11/2005 | Lee et al. |
| 7,253,985 | B1 * | 8/2007 | Gami et al. .................... 360/75 |
| 2007/0195445 | A1 * | 8/2007 | Vanlaanen et al. ............ 360/51 |

FOREIGN PATENT DOCUMENTS

JP 03-209680 9/1991

* cited by examiner

*Primary Examiner*—Andrew L Sniezek
(74) *Attorney, Agent, or Firm*—Pillsbury Winthrop Shaw Pittman, LLP

(57) ABSTRACT

According to one embodiment, a servo writing apparatus that writes a multi-spiral servo pattern to a disk medium is disclosed. The apparatus has a servo controller that generates a servo clock determining a head seek start timing, a servo pattern generator that generates a sector index pulse determining the interval at which a multi-spiral servo pattern is written to the disk medium, a clock phase difference measuring unit that measures a phase difference between the servo clock and the sector index pulse, and a controller that adjusts the measured phase difference.

10 Claims, 7 Drawing Sheets

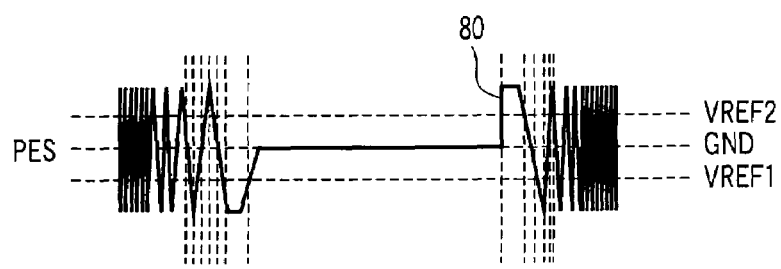
FIG. 8A PES
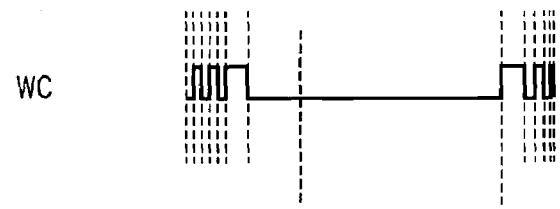
FIG. 8B WC
FIG. 8C MV
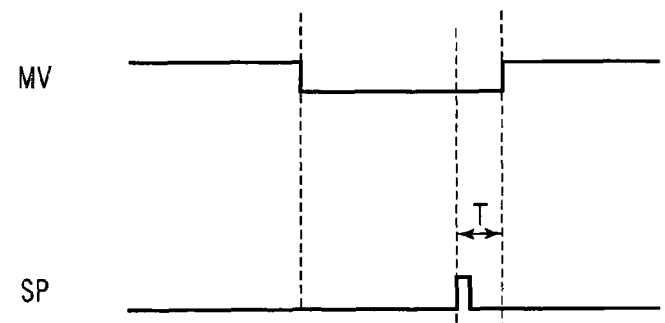
FIG. 8D SP

METHOD AND APPARATUS FOR WRITING SPIRAL SERVO PATTERN IN A DISK DRIVE

CROSS-REFERENCE TO RELATED APPLICATIONS

This application is based upon and claims the benefit of priority from Japanese Patent Application No. 2006-350013, filed Dec. 26, 2006, the entire contents of which are incorporated herein by reference.

BACKGROUND

1. Field

One embodiment of the present invention relates to a disk drive, and in particular, to a servo writing technique for spiral servo patterns.

2. Description of the Related Art

In general, in disk drives typified by hard disk drives, servo patterns (servo data) used for head positioning control are recorded on a disk medium that is a data recording medium. The disk drive uses the servo patterns read by the head to controllably place the head at a target position (target track) on the disk medium.

The servo patterns recorded on the disk medium have a plurality of servo sectors normally arranged at a fixed circumferential interval so as to constitute concentric servo tracks. The disk drive positions the head on the basis of the servo patterns and uses the head to record user data on the disk medium to construct concentric data tracks.

The servo patterns are recorded on the disk medium by a servo writing Block included in a disk drive manufacturing process. A proposal has been made of a method of recording a plurality of spiral servo patterns constituting base patterns on the disk medium during the servo writing Block (see, for example, U.S. Pat. No. 6,965,489B1).

In the servo writing Block in accordance with the proposed method, a plurality of spiral servo patterns (multi-spiral servo pattern) are recorded, by, for example, a dedicated servo track writer (STW), on the disk medium not incorporated yet into a disk drive to be shipped as a product. The disk medium is subsequently incorporated into the disk drive, which performs a servo self-write method to write radial servo patterns (hereinafter referred to as specified servo patterns for convenience) used for the product to the disk medium. The specified servo patterns constitute the concentric servo tracks.

A method of writing a multi-spiral servo pattern to a disk medium involves using a clock head to generate a clock from a clock pattern pre-recoded on the disk medium. A head seek start timing is generated on the basis of the clock. While performing a radial seek operation on the disk medium, the head writes the multi-spiral servo pattern over the entire surface of the disk medium.

Head seek control is performed by a servo controller in the servo track writer. The servo controller performs the head seek operation in synchronism with a servo clock. If the head seek start timing fails to synchronize with the servo clock, the multi-spiral servo pattern is written to the disk medium at a non-uniform intervals.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 8A to 8D are timing charts illustrating the operation of a clock phase difference measuring unit in accordance with the present embodiment.

DETAILED DESCRIPTION

Various embodiments according to the invention will be described hereinafter with reference to the accompanying drawings. In general, according to one embodiment of the invention, there is provided a servo writing device that can always write a multi-spiral servo pattern to a disk medium at a fixed interval.

(Configuration of the Servo Track Writer)

Figure 1:
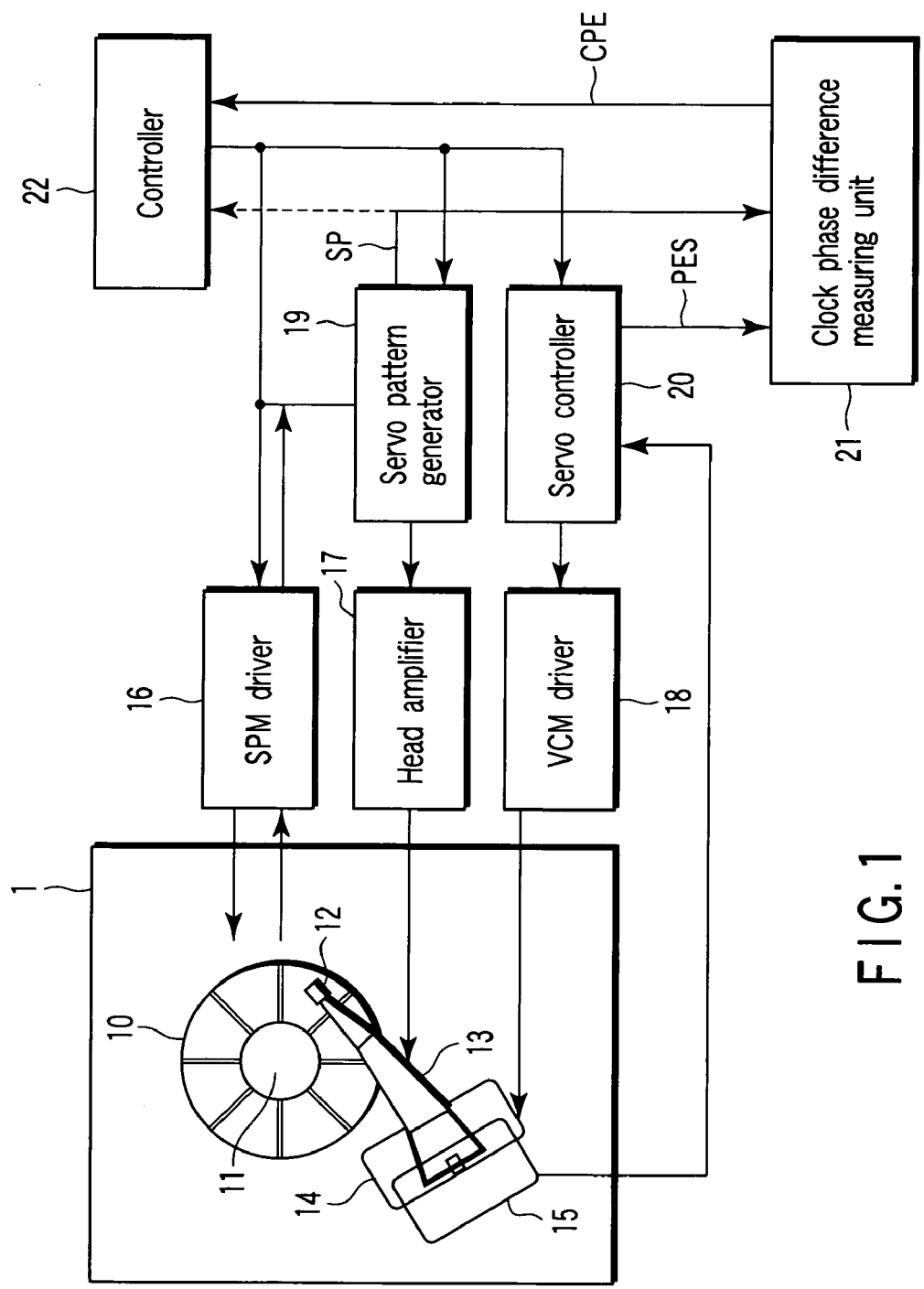
FIG. 1 is a block diagram showing an essential part of a servo track writer in accordance with an embodiment of the present invention.

According to an embodiment, FIG. 1 is a block diagram showing an essential part of a servo track writer.

A servo track writer 1 has a spindle motor (SPM) 11 that rotates a disk medium 10 to which a multi-spiral servo pattern is to be written, and an actuator 13. Once the writer 1 writes the multi-spiral servo pattern to the disk medium 10, the disk medium 10 is incorporated into a disk drive to be shipped as a product. The disk drive uses a servo self-write function to write servo patterns (concentric servo patterns) finally used for the product to the disk medium on the basis of the multi-spiral servo pattern. In the present embodiment, the description of the servo self-write function is omitted.

The spindle motor 11 includes an encoder that generates a clock pulse in synchronism with rotation. An SPM driver 16 supplies a drive current to the spindle motor 11 to control rotational drive. A clock output by the encoder is input to the SPM driver 16, which then outputs the clock synchronizing with rotation to a servo pattern generator 19.

The actuator 13 is a head moving mechanism on which a magnetic head 12 is mounted and which is driven by a voice coil motor (VCM) 14 to move the head 12 radially over the disk medium 10 (seek operation). A read head and a write head separate from the read head are mounted in the magnetic head 12; the read head reads data (the multi-spiral servo pattern or a clock pattern) from the disk medium 10, and the write head writes the multi-spiral servo pattern to the disk medium 10.

VCM 14 is driven by a drive current supplied by the VCM driver 18. An optical positioning sensor (head) 15 is mounted on the actuator 13. The positioning sensor 15 outputs, to a servo controller 20, positional information on VCM 14, that is, positional information corresponding to the radial position of the head 12 on the disk medium 10.

The servo track writer 1 further has a head amplifier 17, a servo pattern generator 19, the servo controller 20, a clock phase difference measuring unit 21, and a controller 22.

The head amplifier 17 amplifies a write signal corresponding to the multi-spiral servo pattern generated by the servo pattern generator 19 and outputs the amplified write signal to the head 12. The write head, included in the head 12, writes the multi-spiral servo pattern corresponding to the write signal to the disk medium 10.

The servo pattern generator 19 generates a sector index pulse SP described below in addition to the multi-spiral servo pattern and outputs the sector index pulse SP to the controller 22 and the clock phase difference measuring unit 21.

On the basis of positional information from the positioning sensor 15, the servo controller 20 controls the actuator 13 via the VCM driver 18 to controllably position the head 12 at a specified position on the disk medium 10 (this includes a seek operation). The servo controller 20 generates a servo clock synchronizing with the seek operation.

The clock phase difference measuring unit 21 measures the time difference between the sector index pulse SP and a rise time for a position error signal PES output by the servo controller 20 and outputs a measured value CPE indicating a clock phase error to the controller 22.

The servo controller 20 outputs the position error signal PES in synchronism with the internally generated servo clock. The position error signal PES indicates a difference between the specified position at which the head 12 is to be placed on the disk medium 10 and the current position corresponding to the position information from the positioning sensor 15. The controller 22 is a main control device for the servo track writer 1 which is made up of, for example, a personal computer.

(Operation of Writing the Multi-Spiral Servo Pattern to the Disk Medium)

With reference to FIGS. 2 to 9, description will be given of an operation of writing the multi-spiral servo pattern in accordance with the present embodiment.

The controller 22 activates the SPM driver 16, the servo pattern generator 19, and the servo controller 20. The SPM driver 16 rotates the disk medium 10.

Figure 2:
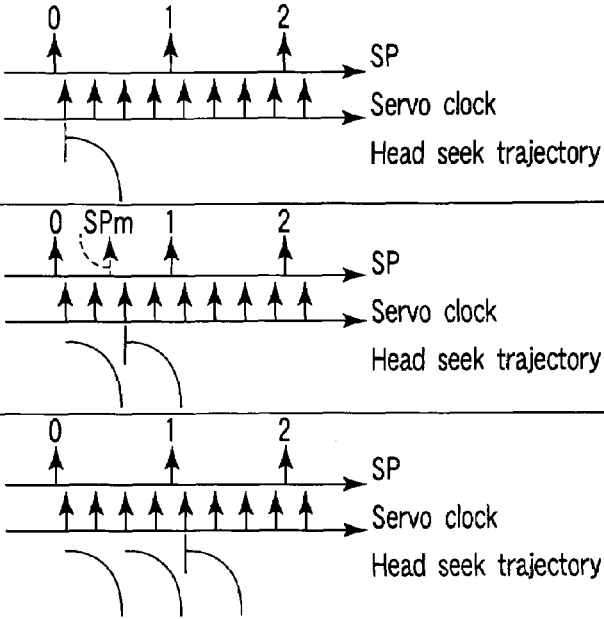
FIG. 2 is a diagram illustrating a method of writing a multi-spiral servo pattern to a disk medium in accordance with the present embodiment.

As shown in FIG. 2, the servo pattern generator 19 generates the sector index pulse SP for each sector of the multi-spiral servo pattern starting with a sector 0. The controller 22 uses the sector index pulse SP as a trigger to issue a seek start signal to the servo controller 20. The servo controller 20 performs control such that the head 12 performs a seek operation at a servo clock timing immediately after a seek start signal.

As shown in FIG. 2, during the first write operation, the controller 22 issues the seek start signal using the sector index pulse SP for the sector 0 as a trigger. The servo controller 20 causes the head 12 to start a seek operation at the servo clock timing. For the trajectory of the head seek operation, the servo controller 20 performs control such that the operation is performed at a uniform speed except for acceleration at the start of the operation and deceleration at the end of the operation.

The servo pattern generator 19 generates spiral servo patterns simultaneously with the start of the seek operation. While performing the seek operation from the innermost to outermost periphery of the disk medium 10, the write head of the head 12 writes a multi-spiral pattern to the disk medium 10. The multi-spiral pattern is made up of two spiral servo patterns per sector.

As shown in FIG. 2, during the second write operation, the servo pattern generator 19 generates a pulse SPm at an intermediate position of the sector index pulse SPm. The servo track writer 1 writes the multi-spiral pattern at the timing of the pulse SPm as is the case with the sector 0.

As shown in FIG. 2, the servo track writer 1 similarly repeatedly performs the write operation at sector 1, at a position midway between sectors 1 and 2, and at sector 2 in this order to write multi-spiral patterns the number of which is double that of servo sectors to the disk medium 10. The sector index pulses including the pulse SPm, generated at the position midway between the sector index pulses, are collectively called the sector index pulse SP.

Figure 3:
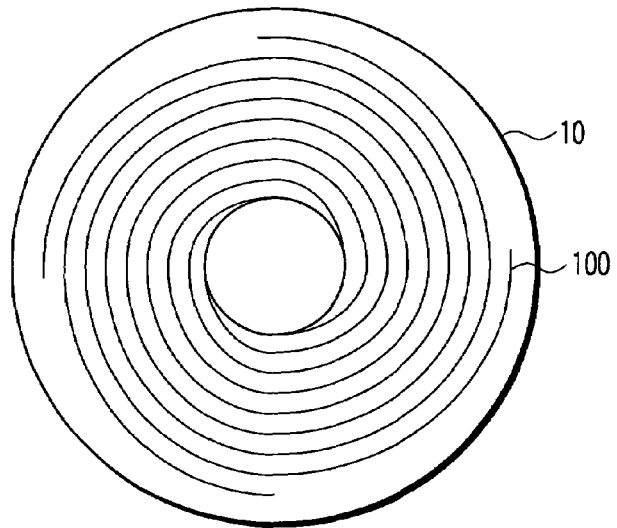
FIG. 3 is a diagram showing an example of the multi-spiral servo pattern in accordance with the present embodiment.

As shown in FIG. 3, the servo track writer 1 performs the above write operation to write, to the disk medium 10, a multi-spiral servo pattern 100 made up of the spiral servo patterns, synchronizing with the sector index pulse SP and arranged at the equal intervals.

Figure 4A:
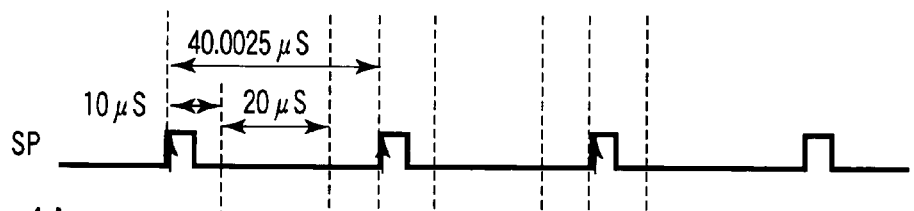
FIG. 4A is a timing chart illustrating timings of a sector index pulse in accordance with the present embodiment.
Figure 4B:
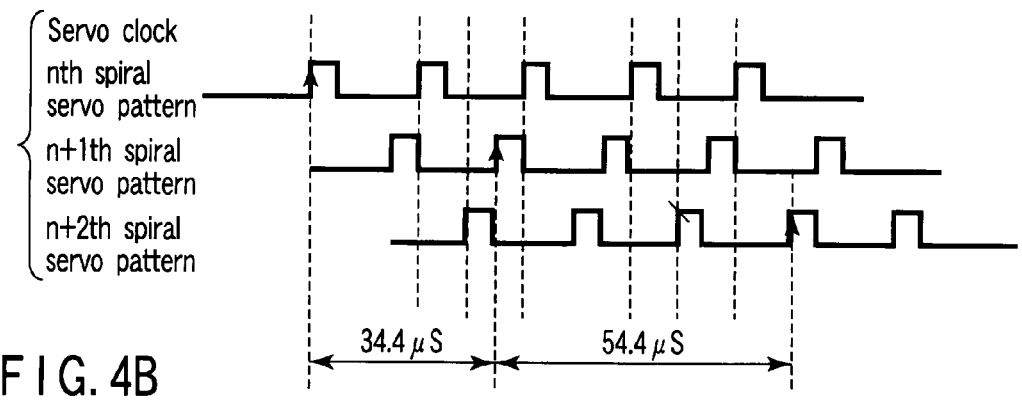
FIG. 4B is a timing chart illustrating timings of a servo clock in accordance with the present embodiment.
Figure 5:
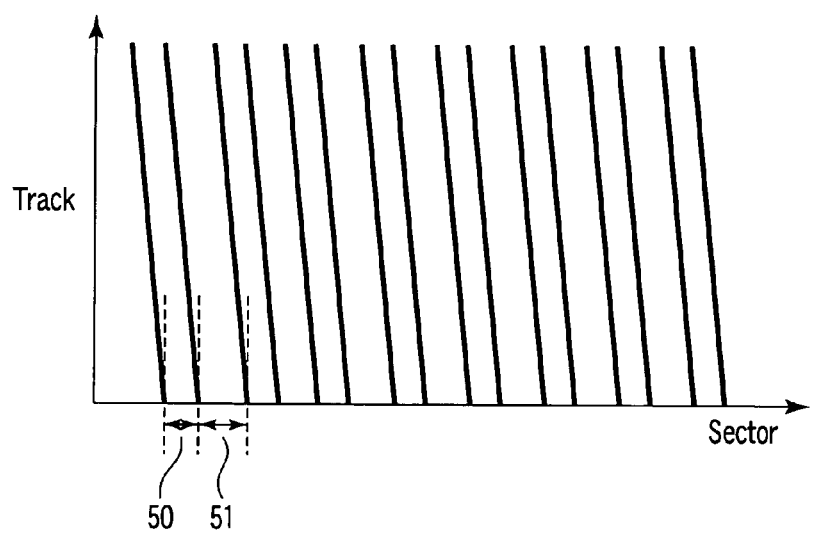
FIG. 5 is a diagram illustrating a state in which the multi-spiral servo pattern in accordance with the present invention has been written to the disk medium at unequal intervals.

FIG. 5 shows a state in which the multi-spiral servo pattern written to the disk medium 10 undergoes periodic non-uniformity and in which the intervals 50 and 51 between the spiral servo patterns are unequal. The cause of this state will be explained with reference to FIGS. 4A and 4B.

In general, the period of the sector index pulse SP needs to be set equal to an integral multiple of the period of the servo clock by adjusting the number of rotations of SPM 11. However, the actual servo track writer may suffer an adjustment error. For example, the period of the sector index pulse SP may be 40.0025 µs, while the servo clock period may be 20.00000 µs; the former may not be an exact integral multiple of the latter.

FIG. 4A is a diagram showing the period of the sector index pulse SP. FIG. 4B is a diagram showing the servo clock period and timings of the sector index pulse SP. The figure shows that the amount of deviation from the integral multiple is 0.0025 µs. Here, the seek time required to write one spiral servo pattern to the disk medium 10 is 730 ms (time for a roundtrip operation). Furthermore, as shown in FIG. 4A, when the nth spiral servo pattern is written to the disk medium 10, the phase difference between the sector index pulse SP and the servo clock is 10 µs.

That is, the rate of the deviation from the integral multiple of the servo clock period is 0.0025 µs per servo clock of (40.0025 µs), that is, 62.5 [ppm]. Every seek operation advances the phase of the servo clock relative to the sector index pulse SP by 730 ms×62.5 [ppm]=45.6 µs. Thus, every seek operation advances the phase of the servo clock relative to that of the sector index pulse SP by an amount equal to the difference of 5.6 µs from the period of the sector index pulse SP of 40.0025 µs. When the n+2th spiral servo pattern is written to the disk medium 10, the deviation corresponds to one servo clock.

The deviation (phase difference) of the servo clock from the sector index pulse SP results in a periodic variation (non-uniformity) in the intervals of the multi-spiral servo pattern. Furthermore, adjusting the period of the sector index pulse SP to an exact integral multiple of the servo clock period sets the interval between the spiral servo patterns at 40.0025 µs. However, a possible phase shift of 5.6 µs sets the interval between the spiral servo patterns at 34.4 µs.

The major cause of the deviation of the period of the sector index pulse SP from an integral multiple of the servo clock period is an adjustment error associated with the frequency setting resolution of hardware and software of the servo track writer. Another cause is an oscillation frequency error in an oscillator for the SPM driver 16, an oscillator for the servo controller 20, or the temperature properties of the oscillators. Furthermore, the amount of the deviation between the period of the sector index pulse SP and the servo clock period varies with time depending on a variation in temperature properties among oscillators or a variation in environmental temperature.

Thus, the servo track writer 1 in accordance with the present embodiment has the clock phase difference measuring unit 21 to measure the phase difference (hereinafter referred to as the clock phase difference) between the sector index pulse SP and the servo clock. The controller 22 uses a measured value CPE from the clock phase difference measuring unit 21 to make adjustment such that a fixed clock phase difference is always maintained. This equalizes (fixes or uniformizes) the intervals of the multi-spiral servo pattern to be written to the disk medium 10.

The controller 22 adjusts the phase difference between the sector index pulse SP and the servo clock on the basis of the seek time required for the head 12 to write the multi-spiral servo pattern to the disk medium 10 (time for a roundtrip operation).

Specifically, the controller 22 adjusts the seek time so that the period equal to a integral multiple of the servo clock period shifts during the time for one seek operation (20, 40, 60 µs, ...). The controller 22 executes a process of adjusting the seek time by the addition of a delay time when the head 12 is in an on-track state on the innermost or outermost periphery of the disk medium 10 after all of the multi-spiral servo pattern has been written to the disk medium 10.

A specific description will be given below of the process of adjusting the clock phase difference in accordance with the present embodiment.

First, the controller 22 sets initial values for delay times for clock phase difference adjustment for the clock adjustment error measured at the start of a seek operation for a write operation of the head 12 and the oscillation frequency error in the oscillator for the servo controller 20. Here, a clock phase deviation speed resulting from the clock adjustment error is defined as $P_0$. A clock phase deviation speed resulting from the oscillator frequency error is defined as $P_1$. The seek time with a delay time of 0 (time for one roundtrip operation for one sector) is defined as $T_0$. An initial value for the delay time is defined as $T_{Delay}$. The servo clock period is defined as $T_{SVR}$. n is an integer. Then, Expression 1 is obtained.

$$(T_0 + T_{Delay}) \times (P_0 + P_1) = n \times T_{SVR} \quad (1)$$

Expression 2 is obtained from Expression 1.

$$T_{Delay} = \frac{n \times T_{SVR}}{P_0 + P_1} - T_0 \quad (2)$$

In the present embodiment, n=3, $T_{SVR}$=20 µs, $P_0$=62.5 [ppm], $P_1$=16.3 [ppm], and $T_0$=600 ms. Thus, on the basis of Expression (2), the initial value for the delay time ($T_{Delay}$) is 161 ms.

As described above, setting the initial value for the delay time enables the correction of the clock phase difference resulting from a clock adjustment error and an oscillator frequency error. However, it is also necessary to correct the adverse effect of the temporally varying environmental temperature of the writer 1 and of the temperature properties of the oscillators.

Figure 6:
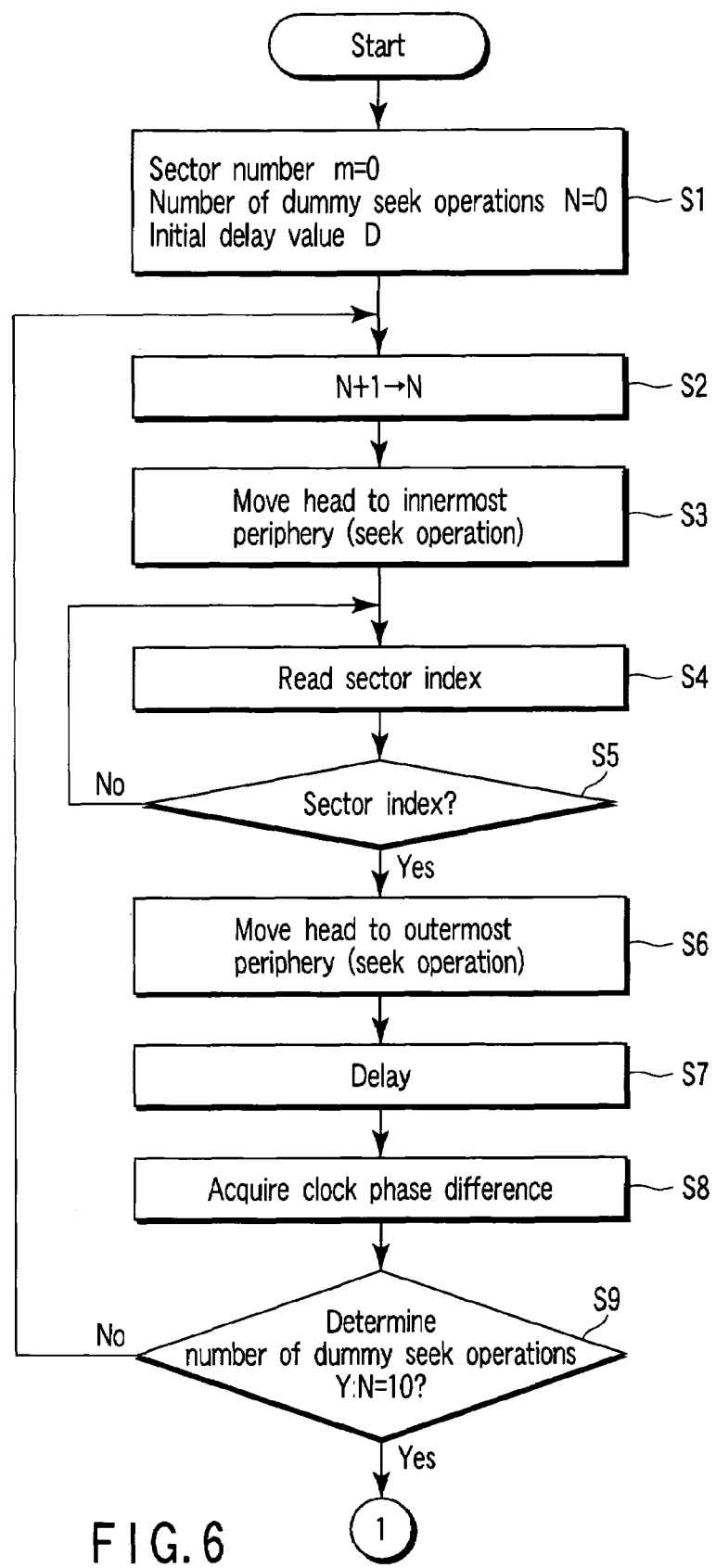
FIG. 6 is a flowchart illustrating the procedure of a clock phase difference adjusting process in accordance with the present embodiment.

Now, with reference to flowcharts in FIGS. 6 and 7, description will be given of a process of adjusting the phase difference between the sector index pulse SP and the servo clock (timing tuning process). This method enables a temporal variation in clock phase difference to be corrected.

The controller 22 sets a spiral servo pattern write sector number m (Block S1). Here, the operation starts the sector 0, and the controller 22 thus sets 0. The controller 22 further sets the number N of dummy seek operations at 0. In a dummy seek operation, the clock phase difference measuring unit 21 inputs the measured value CPE for the clock phase difference between the sector index pulse SP and the servo clock to the controller 22, which thus acquires data required to determine the clock phase difference. During the dummy seek operation, the controller 22 performs only the seek operation of the head 12 without writing any spiral servo patterns to the disk medium 10. The controller 22 stores an initial set value D for the delay time.

Then, the controller 22 increments the number of dummy seek operations and moves the head 12 to the innermost periphery of the disk medium 10 (seek operation; Blocks S2 and S3). The controller 22 waits for the sector index pulse SP with the set sector number m to be detected (Blocks S4 and S5).

Upon detecting the sector index pulse SP, the controller 22 moves the head 12 to the outermost periphery of the disk medium 10 (seek operation; YES in Blocks S5 and S6). In this case, the dummy seek operation inhibits the write head from performing the operation of writing the spiral servo patterns to the disk medium.

After completing moving the head 12 to the outermost periphery (seek operation), the controller 22 waits for an amount of time equal to the initial set delay time D with the head 12 maintained in the on-track state (Block S7). The controller 22 acquires the value for the clock phase difference measured at the start of movement (seek operation) to the outermost periphery and saves the value to an internal register (Block S8). The controller 22 then determines whether or not the number of dummy seek operations has reached a predetermined number N (for example, N=10). The above process is repeated until for example, 10 dummy seek operations have been performed (NO in Block S9).

Figure 7:
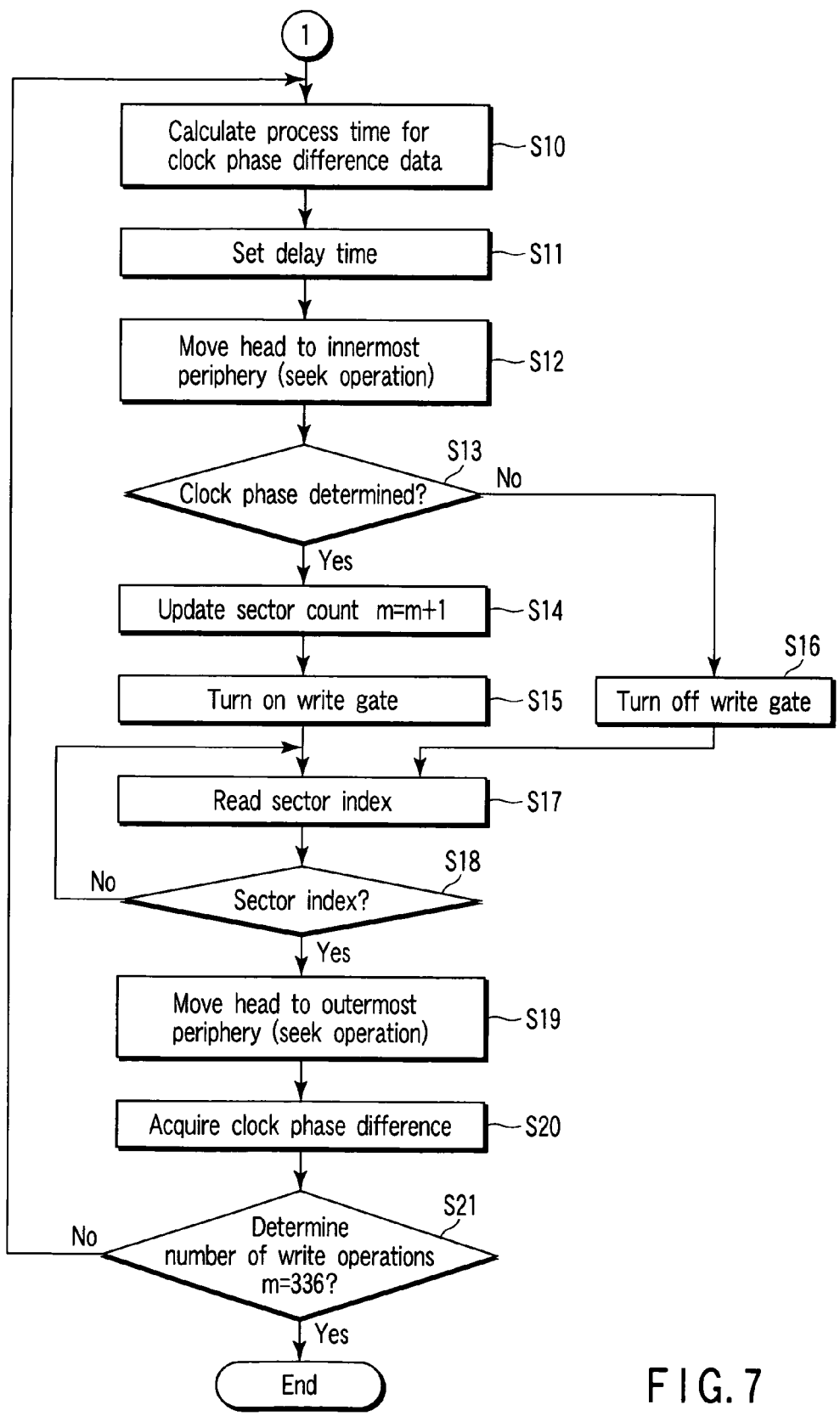
FIG. 7 is a flowchart illustrating the procedure of the clock phase difference adjusting process in accordance with the present embodiment.

After repeating the dummy seek operation 10 times, the controller 22 executes such a process as shown in FIG. 7 (YES in Block S9).

That is, the controller 22 calculates the clock phase difference and the amount of variation in clock phase difference on the basis of the measured data on the clock phase difference acquired during the dummy seek operations (Block S10). The controller 22 calculates the delay time that allows the clock phase difference to be fixed. Specifically, the controller 22 performs the following calculation.

The difference $d_n$ among the 10 clock phase difference measured data ($t_1, t_2, \ldots, t_{10}$) is calculated (see Expression 3).

$$d_n = t_n + 1 - t_n (n < 10) \quad (3)$$

Then, any of the difference data $d_n$ which has suffered a clock deviation is omitted. The condition for effective data is shown in Expression 4.

$$|d_n| < 20 \,\mu S \text{ (servo frequency 20 µS)} \quad (4)$$

Here, 20 µs indicates a servo frequency.

The controller 22 calculates a corrected value for the delay time from the latest one of the effective difference data $d_n$. Here, the latest effective one of the data $d_n$ is defined as $d_k$. The clock phase shift speed at the corresponding point in time is defined as $P_k$. The seek time (the time for a roundtrip operation for one sector) including the initial value D for the delay time is defined as $T_{SK}$. The servo clock period is defined as $T_{SVR}$. The corrected value for the delay time is defined as $DT_{Delay}$. Expression 5 is then obtained.

$$T_{SK} \times P_k = (n \times T_{SVR}) + d_k \quad (5)$$

Expression 6 is obtained from Expression 5.

$$P_k = \frac{(n \times T_{SVR}) + d_k}{T_{SK}} \quad (6)$$

Furthermore, the latest effective data $d_k$ can be calculated from the corrected value $DT_{Delay}$ for the delay time using Expression 7.

$$DT_{Delay} \times P_k = d_k \quad (7)$$

Expression 8 can be obtained from Expressions 6 and 7.

$$DT_{Delay} = d_k \times \frac{T_{SK}}{n \times T_{SVR} + d_k} \quad (8)$$

Moreover, when the initial value for the delay time is defined as $T_{Delay}$, a newly set delay time $T_1$ can be calculated using Equation 9.

$$T_1 = T_{Delay} - DT_{Delay} \quad (9)$$

The controller 22 sets the delay time corrected as described above (Block S11). The controller 22 then moves the head 12 to the innermost periphery of the disk medium 10 (seek operation; Block S12). On the basis of the latest clock phase difference and clock phase variation amount, the controller 22 determines the clock phase difference to further determine whether to perform the operation of writing the spiral servo patterns to the disk medium or to perform the dummy seek operation to correct the clock phase difference (Block S13).

Here, the latest clock phase difference is defined as $T_k$. The latest clock phase variation amount is defined as $d_k$. The process time from a timing at which the sector index pulse is detected until the servo controller 20 outputs a position error signal is defined as $T_{FM}$. The servo clock period is defined as $T_{SVR}$. n denotes an integer. Then, a determination condition for a permission to write a servo pattern can be defined as a condition under which no clock deviation occurs, using Conditional Expression 10.

$$n \times T_{SVR} + T_{FM} < T_k + d_k < (n+1) \times T_{SVR} + T_{FM} \quad (10)$$

Upon determining, in the clock phase determination, that the spiral servo pattern is permitted to be written to the disk medium 10, the controller 22 increments the sector number by one and turns on the write gate (YES in Blocks S13 to S15). If the spiral servo pattern is not permitted to be written to the disk medium 10, the controller 22 turns off the write gate (NO in Blocks S13 and S16).

In either case, the controller 22 waits for the sector index pulse SP with the set sector number m to be detected (Blocks S17 and S18). Upon detecting the sector index pulse SP, the controller 22 moves the head 12 to the outermost periphery of the disk medium 10 (seek operation; YES in Blocks S18 and S19). Here, if the spiral servo pattern is permitted to be written to the disk medium 10, the write head writes the spiral servo pattern to the disk medium 10.

The controller 22 acquires the measured value CPE for the clock phase difference from the clock phase difference measuring unit 21 upon starting the movement to the outermost periphery (seek operation), and saves the value to the register after the end of the seek operation (Block S20). The register holds 10 latest data including those acquired during the dummy seek operation, with old data updated.

The controller 22 checks the sector index number, and if the number is not final (in this case, 336), repeats the processing starting in Block S10 to continue the operation of writing the multi-spiral servo pattern (Block S21).

Figure 9:
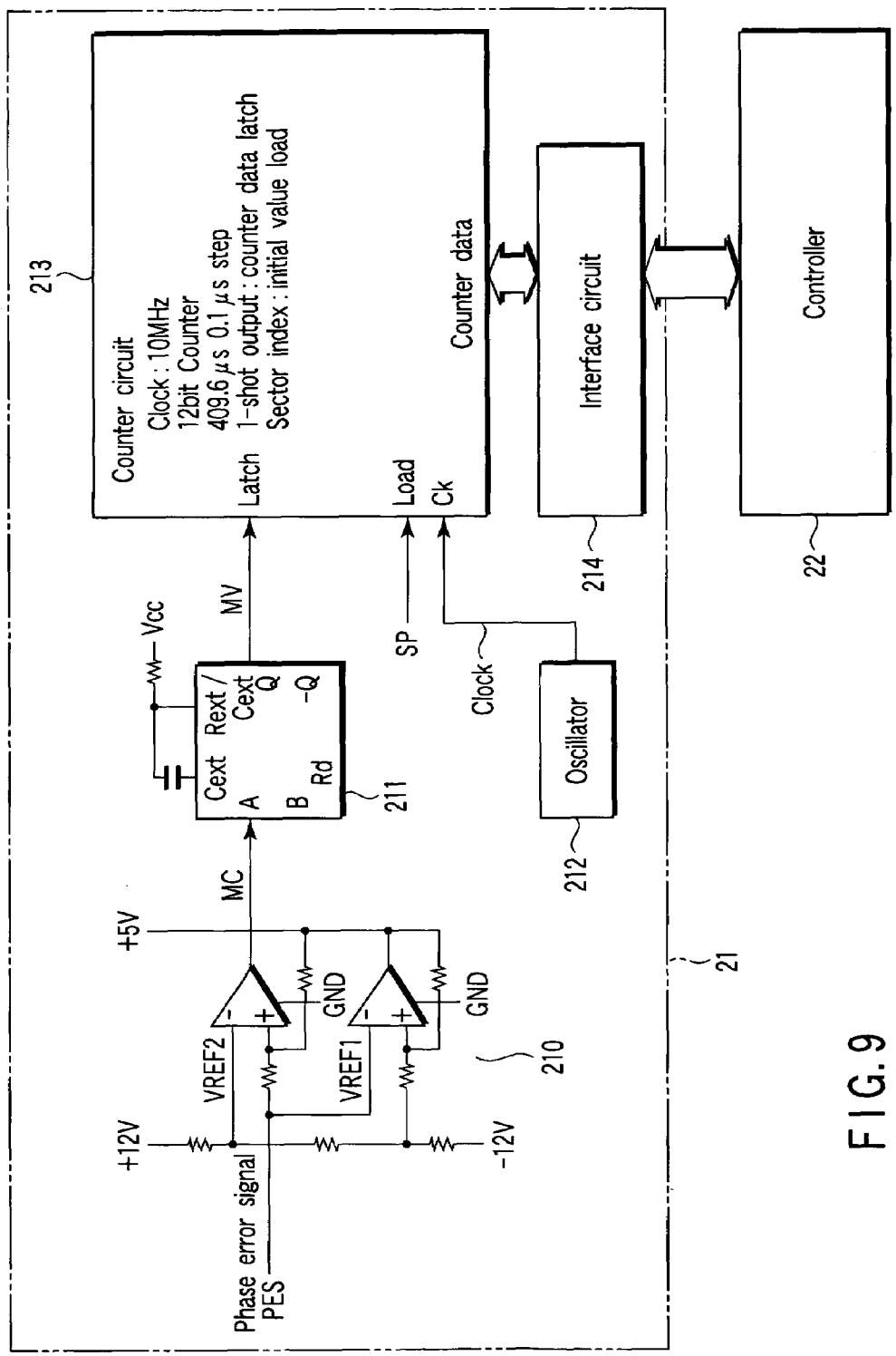
FIG. 9 is a block diagram showing an example of a clock phase difference measuring unit in accordance with the present embodiment.

FIG. 9 is a block diagram showing an example of the clock phase difference measuring unit 21 in accordance with the present embodiment. The configuration of the clock phase difference measuring unit 21 will be described with reference to FIGS. 8A to 8D.

As shown in FIG. 9, the clock phase difference measuring unit 21 has a window comparator 210, a retriggerable monostable multivibrator 211, an oscillator 212, a counter circuit 213, and an interface circuit 214.

As shown in FIG. 8A, the position error signal PES, output by the servo controller 20, is input to the comparator 210. The comparator 210 then converts the position error signal PES with, for example, a ±10-V range into a pulse signal WC with a range from 0 to 5V, and outputs the pulse signal WC. As shown in FIG. 8A, the position error signal PES rises at a timing 80 when the seek operation of moving the head from the innermost periphery to the outermost periphery is started. The position error signal PES indicates a position error between a specified position (target position) and the current position on the disk medium 10 during the seek operation as described above.

The multivibrator 211 filters the output WC from the comparator 210 and outputs the resulting signal MV containing only the rising edge of the timing 80 at which the seek operation is started from the innermost periphery as shown in FIG. 8C.

The sector index pulse SP generated by the servo pattern generator 19 is loaded into the counter circuit 213, which then starts counting a clock supplied by the oscillator 212. The counter circuit 213 latches the count value at a rise time of the output MV from the multivibrator 211. At the end of the seek operation, the interface circuit 214 transfers the count value in the counter circuit 213 to the controller 22, for example, via an ISA bus.

The counter circuit 213 counts the time T from a rise in the sector index pulse SP until a rise in the output MV from the multivibrator 211 (timing 80). The counter circuit 231 outputs the corresponding count value as the measured value CPE for the clock phase difference time. Specifically, the counter circuit 213 is, for example, a 12-bit counter for a 10-MHz clock from the oscillator 212 and can measure up to 409.61 μs in Blocks of 0.1 μs.

As described above, the present embodiment measures the time difference between the rise time of the sector index pulse SP and the rise time of the position error signal PES output during the seek operation and adjusts the delay time after the completion of the seek operation on the basis of the time difference. This adjusting process enables the phase difference between the sector index pulse SP and the servo clock to be fixed, making it possible to uniformize (equalize) the intervals at which the multi-spiral servo pattern is written to the disk medium 10.

In other words, the present embodiment can provide a servo track writer which writes a multi-spiral servo pattern to a disk medium and which has a timing tuning function. By adjusting the delay time after the completion of the seek operation of the head 12, the writer can adjust the roundtrip seek time for one sector to fix the phase difference between the sector index pulse SP and the servo clock at the start of the seek operation. This enables the spiral servo patterns to be written to the disk medium at equal intervals, allowing the multi-spiral servo pattern to be recorded on the disk medium 10 at uniform intervals.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An apparatus for writing servo data on a disk medium in a disk drive, comprising:
   a head moving unit which allows a head included in a disk drive to perform a radial seek operation on a disk medium;
   a first generator which generates a servo clock determining timing for the seek operation of the head;

a second generator which generates a sector index pulse to determine intervals at which a multi-spiral servo pattern is written to the disk medium, in which a phase difference between the sector index pulse and the servo clock varies by an amount corresponding to one or more servo clock periods, when one sector of the multi-spiral servo pattern is written to the disk medium;

a write unit which allows the head to write the multi-spiral servo pattern to the disk medium on the basis of the servo clock and the sector index pulse;

a measuring unit which measures the phase difference between the servo clock and the sector index pulse; and an adjusting unit which calculates the amount of variation of the phase difference based on a measured value from the measuring unit, and adjusts the phase difference to cause the phase difference to be constant, wherein the first generator includes a servo controller which controls the head moving unit and which outputs a position error signal for the head in synchronism with the servo clock, and the measuring unit measures the phase difference between the sector index pulse and the position error signal.

2. The apparatus according to claim 1, wherein on the basis of the measured value from the measuring unit, the adjusting unit adjusts the phase difference and the variation of the phase difference by adjusting a time required to write one sector of the multi-spiral servo pattern to the disk medium, with the head in an on-track state on an innermost periphery or outermost periphery of the disk medium, so that the phase difference is shifted by an amount equal to an integral multiple of one period of the servo clock.

3. An apparatus for writing servo data on a disk medium in a disk drive, comprising:

a head moving unit which allows a head included in a disk drive to perform a radial seek operation on a disk medium;

a first generator which generates a servo clock determining timing for the seek operation of the head;

a second generator which generates a sector index pulse to determine intervals at which a multi-spiral servo pattern is written to the disk medium, in which a phase difference between the sector index pulse and the servo clock varies by an amount corresponding to one or more servo clock periods, when one sector of the multi-spiral servo pattern is written to the disk medium;

a write unit which allows the head to write the multi-spiral servo pattern to the disk medium on the basis of the servo clock and the sector index pulse;

a measuring unit which measures the phase difference between the servo clock and the sector index pulse; and an adjusting unit which calculates the amount of variation of the phase difference based on a measured value from the measuring unit, and adjusts the phase difference to cause the phase difference to be constant, wherein the first generator includes a servo controller which controls the head moving unit and which outputs a position error signal for the head in synchronism with the servo clock, and the measuring unit measures a time difference between a time when the sector index pulse rises and a time when the position error signal rises.

4. An apparatus for writing servo data on a disk medium in a disk drive, comprising:

a head moving unit which allows a head included in a disk drive to perform a radial seek operation on a disk medium;

a first generator which generates a servo clock determining timing for the seek operation of the head;

a second generator which generates a sector index pulse to determine intervals at which a multi-spiral servo pattern is written to the disk medium, in which a phase difference between the sector index pulse and the servo clock varies by an amount corresponding to one or more servo clock periods, when one sector of the multi-spiral servo pattern is written to the disk medium;

a write unit which allows the head to write the multi-spiral servo pattern to the disk medium on the basis of the servo clock and the sector index pulse;

a measuring unit which measures the phase difference between the servo clock and the sector index pulse; and an adjusting unit which calculates the amount of variation of the phase difference based on a measured value from the measuring unit, and adjusts the phase difference to cause the phase difference to be constant, wherein the adjusting unit adjusts the phase difference by adjusting a seek time required to perform the head seek operation on the basis of the measured value from the measuring unit.

5. An apparatus for writing servo data on a disk medium in a disk drive, comprising:

a head moving unit which allows a head included in a disk drive to perform a radial seek operation on a disk medium;

a first generator which generates a servo clock determining timing for the seek operation of the head;

a second generator which generates a sector index pulse to determine intervals at which a multi-spiral servo pattern is written to the disk medium, in which a phase difference between the sector index pulse and the servo clock varies by an amount corresponding to one or more servo clock periods, when one sector of the multi-spiral servo pattern is written to the disk medium;

a write unit which allows the head to write the multi-spiral servo pattern to the disk medium on the basis of the servo clock and the sector index pulse;

a measuring unit which measures the phase difference between the servo clock and the sector index pulse; and an adjusting unit which calculates the amount of variation of the phase difference based on a measured value from the measuring unit, and adjusts the phase difference to cause the phase difference to be constant, wherein on the basis of the measured value from the measuring unit, the adjusting unit adjusts the phase difference by addition of a delay time with the head in an on-track state on an innermost periphery or outermost periphery of the disk medium after all of the multi-spiral servo pattern has been written to the disk medium.

6. An apparatus for writing servo data on a disk medium in a disk drive, comprising:

a head moving unit which allows a head included in a disk drive to perform a radial seek operation on a disk medium;

a first generator which generates a servo clock determining timing for the seek operation of the head;

a second generator which generates a sector index pulse to determine intervals at which a multi-spiral servo pattern is written to the disk medium, in which a phase difference between the sector index pulse and the servo clock varies by an amount corresponding to one or more servo clock periods, when one sector of the multi-spiral servo pattern is written to the disk medium;

a write unit which allows the head to write the multi-spiral servo pattern to the disk medium on the basis of the servo clock and the sector index pulse;

a measuring unit which measures the phase difference between the servo clock and the sector index pulse; and an adjusting unit which calculates the amount of variation of the phase difference based on a measured value from the measuring unit, and adjusts the phase difference to cause the phase difference to be constant, wherein the first generator includes a servo controller which controls the head moving unit and which outputs a position error signal for the head in synchronism with the servo clock, the measuring unit measures a time difference between a time when the sector index pulse rises and a time when the position error signal rises, and the adjusting unit allows the head to perform a plurality of dummy seek operations with the multi-spiral servo pattern write operation inhibited, to adjustably fix a time difference measured by the measuring unit during the dummy seek operations.

7. A method according of writing servo data on a disk medium in a disk drive that has a head and the disk medium, the method comprising:

measuring a phase difference between a sector index pulse and a servo clock determining timing for a seek operation of the head;

calculating the amount of variation in the phase difference on the basis of a measured value obtained by the measuring;

adjusting the phase difference to cause the phase difference to be constant; and allowing the head to write a multi-spiral servo pattern to the disk medium on the basis of the servo clock and the sector index pulse, wherein the adjusting adjusts the phase difference by adjusting a seek time required to perform the head seek operation on the basis of the measured value obtained by the measuring.

8. A method according of writing servo data on a disk medium in a disk drive that has a head and the disk medium, the method comprising:

measuring a phase difference between a sector index pulse and a servo clock determining a timing for a seek operation of the head;

calculating the amount of variation in the phase difference on the basis of a measured value obtained by the measuring;

adjusting the phase difference to cause the phase difference to be constant; and allowing the head to write a multi-spiral servo pattern to the disk medium on the basis of the servo clock and the sector index pulse, wherein on the basis of the measured value obtained by the measuring, the adjusting adjusts the phase difference by addition of a delay time with the head in an on-track state on an innermost periphery or outermost periphery of the disk medium after all of the multi-spiral servo pattern has been written to the disk medium.

9. An apparatus for writing servo data on a disk medium in a disk drive, comprising:

a head moving unit which allows a head included in a disk drive to perform a radial seek operation on a disk medium;

a first generator which generates a servo clock determining timing for the seek operation of the head;

a second generator which generates a sector index pulse to determine intervals at which a multi-spiral servo pattern is written to the disk medium, in which a phase difference between the sector index pulse and the servo clock varies by an amount corresponding to one or more servo clock periods, when one sector of the multi-spiral servo pattern is written to the disk medium;

a write unit which allows the head to write the multi-spiral servo pattern to the disk medium on the basis of the servo clock and the sector index pulse;

a measuring unit which measures the phase difference between the servo clock and the sector index pulse; and an adjusting unit which calculates the amount of variation of the phase difference based on a measured value from the measuring unit, and adjusts the phase difference to cause the phase difference to be constant, wherein the adjusting unit adjusts the phase difference and the variation, using conditional expression:

$$n \times T_{SVR} + T_{FM} < T_K + d_K < (n+1) \times T_{SVR} + T_{FM}$$

where the phase difference is defined as $T_k$, the amount of the variation in the phase difference is defined as $d_k$, a process time from a timing at which the sector index pulse is detected until a position error signal is outputted is defined as $T_{FM}$, the servo clock period is defined as $T_{SVR}$, n denotes an integer.

10. A method of writing servo data on a disk medium in a disk drive that has a head and the disk medium, the method comprising:

measuring a phase difference between a sector index pulse and a servo clock determining a timing for a seek operation of the head;

calculating the amount of variation in the phase difference on the basis of a measured value obtained by the measuring;

adjusting the phase difference to cause the phase difference to be constant; and allowing the head to write a multi-spiral servo pattern to the disk medium on the basis of the servo clock and the sector index pulse, wherein the adjusting adjusts the phase difference and the variation, using conditional expression:

$$n \times T_{SVR} + T_{FM} < T_K + d_K < (n+1) \times T_{SVR} + T_{FM}$$

where the phase difference is defined as $T_k$, the amount of the variation in the phase difference is defined as $d_k$, a process time from a timing at which the sector index pulse is detected until a position error signal is outputted is defined as $T_{FM}$, the servo clock period is defined as $T_{SVR}$, n denotes an integer.

* * * * *